(12) United States Patent
Asai

(10) Patent No.: US 8,208,023 B2
(45) Date of Patent: Jun. 26, 2012

(54) DOOR MIRROR AND VEHICLE PERIPHERY MONITORING APPARATUS

(75) Inventor: Goro Asai, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 412 days.

(21) Appl. No.: 12/601,034

(22) PCT Filed: May 30, 2008

(86) PCT No.: PCT/IB2008/001386
§ 371 (c)(1), (2), (4) Date: Nov. 20, 2009

(87) PCT Pub. No.: WO2008/146149
PCT Pub. Date: Dec. 4, 2008

(65) Prior Publication Data
US 2010/0165100 A1 Jul. 1, 2010

(30) Foreign Application Priority Data
May 31, 2007 (JP) .................................. 2007-146205

(51) Int. Cl.
*H04N 7/18* (2006.01)
(52) U.S. Cl. ........................................ 348/148; 348/151
(58) Field of Classification Search .................. 348/135, 348/148, 151
See application file for complete search history.

(56) References Cited

U.S. PATENT DOCUMENTS

| 5,497,306 | A | * | 3/1996 | Pastrick ........................ 362/494 |
| 6,738,570 | B2 | * | 5/2004 | Shinohara et al. ............... 396/25 |
| 6,959,994 | B2 | * | 11/2005 | Fujikawa et al. ............. 359/871 |
| 2003/0214733 | A1 | | 11/2003 | Fujikawa et al. |
| 2007/0023611 | A1 | | 2/2007 | Saccagno |

FOREIGN PATENT DOCUMENTS

| EP | 1 362 741 | 11/2003 |
| JP | 2000 16181 | 1/2000 |
| JP | 2001-249376 | 9/2001 |
| JP | 2002 277611 | 9/2002 |
| JP | 2003 267140 | 9/2003 |
| JP | 2004 182040 | 7/2004 |
| JP | 2005 14858 | 1/2005 |
| JP | 2005 41240 | 2/2005 |
| JP | 2005 192114 | 7/2005 |
| JP | 2006 313312 | 11/2006 |
| JP | 2007 314042 | 12/2007 |

OTHER PUBLICATIONS

Japanese Office Action issued on Mar. 17, 2009, in the corresponding Japanese Patent Application No. 2007-146205 (with Partial English Translation).

* cited by examiner

*Primary Examiner* — Moustafa M Meky
(74) *Attorney, Agent, or Firm* — Oblon, Spivak, McClelland, Maier & Neustadt, L.L.P.

(57) ABSTRACT

A door mirror includes an imaging unit that is pointed downward, and a redirecting mechanism, which is positioned at least in front of and to the side of, with respect to the longitudinal direction of a vehicle, a lens of the imaging unit, for redirecting water droplets that would otherwise flow from the radially outer side to the radially inner side of the lens.

19 Claims, 7 Drawing Sheets

DOOR MIRROR AND VEHICLE PERIPHERY MONITORING APPARATUS

BACKGROUND OF THE INVENTION

1. Field of the Invention

The invention relates to a door mirror and a vehicle periphery monitoring apparatus applied to a vehicle such as a passenger vehicle, lorry (truck) or bus or the like.

2. Description of the Related Art

Japanese Patent Application Publication No. 2000-16181 (JP-A-2000-16181) describes a vehicle periphery monitoring apparatus which aims to help prevent a wheel of a vehicle from falling into a ditch or gutter when pulling off to the side of the road, as well as help prevent the rear wheel from riding up onto a kerb (curb) of a pavement (sidewalk) when making a left turn by enabling a driver to see an area that is out of view (i.e., a blind spot) on the passenger's side of the vehicle. This apparatus includes a camera that is pointed downward, provided on the passenger's side door mirror, and has a protruding portion that is formed extending out from in front, with respect to the longitudinal direction of the vehicle, of the camera to prevent dirt from adhering to the lens of the camera.

However, even though the protruding portion of this kind of vehicle periphery monitoring apparatus prevents water droplets that run down the front side of the door mirror from the upper side of the door mirror surface toward the lens of the camera from reaching the lens, it is unable to prevent water droplets that run down the side, with respect to the longitudinal direction of the vehicle, of the door mirror from the upper side of the door mirror surface toward the lens of the camera from reaching the lens. As a result, water droplets that run from the upper side of the door mirror surface down the side of the door mirror toward the lens of the camera end up adhering to the lens of the camera, where they distort the image captured by the camera, and as a result, the driver is unable to see the area that is out of view (i.e., the blind spot) on the passenger's side of the vehicle.

SUMMARY OF THE INVENTION

This invention thus provides a vehicle periphery monitoring apparatus with good visibility, as well as a door mirror that employs that apparatus.

A first aspect of the invention relates to a door mirror that includes an imaging unit that points downward, and redirecting means, which is positioned at least in front of and to the side of, with respect to the longitudinal direction of a vehicle, a lens of the imaging unit, for redirecting a water droplet that would otherwise travel from a radially outer side to a radially inner side of the lens.

In this aspect, the redirecting means may be formed by a groove.

This structure makes it possible to inhibit water droplets from adhering to the surface of the lens by redirecting water droplets that would otherwise travel from the radially outer side toward the radially inner side of the lens of the imaging unit over the front or side surface of the door mirror, using the groove such that those water droplets travel in the direction of the groove instead.

With this structure, the groove may be formed in an annular shape.

This makes it possible to reliably inhibit not only water droplets that travel down the front and side surfaces of the door mirror, but also water droplets that may travel toward the lens of the imaging unit along another path, which is also conceivable, from adhering to the lens.

In addition, with this structure, by making the redirecting means a groove, it is possible to prevent the area captured by the imaging unit from being made narrower as a result of being partially blocked by the redirecting means, as would likely be the case if the water droplets were prevented from reaching the lens by providing a protrusion, for example.

This structure may also include a peripheral member positioned to the radially outer side of the lens of the imaging unit, and the groove may be formed in a space between the peripheral member and the imaging unit.

Forming the groove in the space between the imaging unit and the peripheral member positioned to the radially outer side of the lens of the imaging unit in this way obviates the need for adding a separate part, as well as makes it possible to provide the groove on the door mirror easily from a design standpoint.

The foregoing structure may also include a peripheral member positioned to the radially outer side of the lens of the imaging unit, and the groove may be formed in the peripheral member.

With this structure as well, with only a minor change to an existing part, water droplets that travel over the surface of the door mirror toward the lens of the imaging unit can be redirected by the groove so that they travel in the direction of the groove instead, thereby those inhibiting water droplets from adhering to the surface of the lens.

The foregoing structure may also include a lens cover that covers the lens of the imaging unit, and the groove may be formed in the lens cover.

With this structure as well, with only a minor change to an existing part, water droplets that travel over the surface of the door mirror toward the lens cover that covers the lens of the imaging unit can be redirected by the groove so that they travel in the direction of the groove instead, thereby inhibiting those water droplets from adhering to the surface of the lens cover that covers the lens.

With this structure, the groove may be perpendicular to the radial direction of the lens of the imaging unit.

The foregoing structure may also include a peripheral member positioned to the radially outer side of the lens of the imaging unit, and the redirecting means may be formed by protruding a step formed on the peripheral member.

Accordingly, water droplets that travel over the surface of the door mirror toward the lens are redirected by being stripped away from the surface of the door mirror by the step, thus inhibiting those water droplets from adhering to the surface of the lens. In particular, if a large number of water droplets have adhered to the surface of the door mirror due to heavy rainfall, for example, those water droplets can be stripped away from the surface of the door mirror so water droplets can be inhibited from adhering to the surface of the lens, regardless of how many there are.

With the foregoing structure, the step may protrude out to the radially inner side of the lens.

With the foregoing structure, the step may protrude downward in the axial direction of the lens.

The foregoing structure may also include a lens cover that covers the lens of the imaging unit, and the step may be formed in the lens cover.

With the foregoing structure, the step may be formed in an annular shape.

This structure makes it possible to reliably inhibit not only water droplets that travel down the front and side surfaces of the door mirror, but also water droplets that may travel toward the lens of the imaging unit along another path, which is also conceivable, from adhering to the lens.

In the foregoing structure, the step may be perpendicular to the radial direction of the lens of the imaging unit.

The structure may also include a step that strips away the water droplet that would travel from the radially outer side to the radially inner side of the lens of the imaging unit.

In this structure, the step may protrude toward the radially inner side of the lens.

In the foregoing structure, the step may protrude downward in the axial direction of the lens.

The structure may also include a lens cover that covers the lens of the imaging unit, and the step may be formed in the lens cover.

In the foregoing structure, the step may be formed in an annular shape.

In the foregoing structure, the step may be perpendicular to the radial direction of the lens of the imaging unit.

A second aspect of the invention relates to a vehicle periphery monitoring apparatus. This vehicle periphery monitoring apparatus includes the imaging unit of the door mirror according to the first aspect, and displaying means for displaying an image captured by the imaging unit.

This makes it possible to structure the vehicle periphery monitoring apparatus using a door mirror that can inhibit water droplets from adhering to the lens of the imaging unit or the lens cover.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE EMBODIMENTS

The present invention will now be described in more detail in terms of exemplary embodiments with reference to the accompanying drawings.

Figure 1:
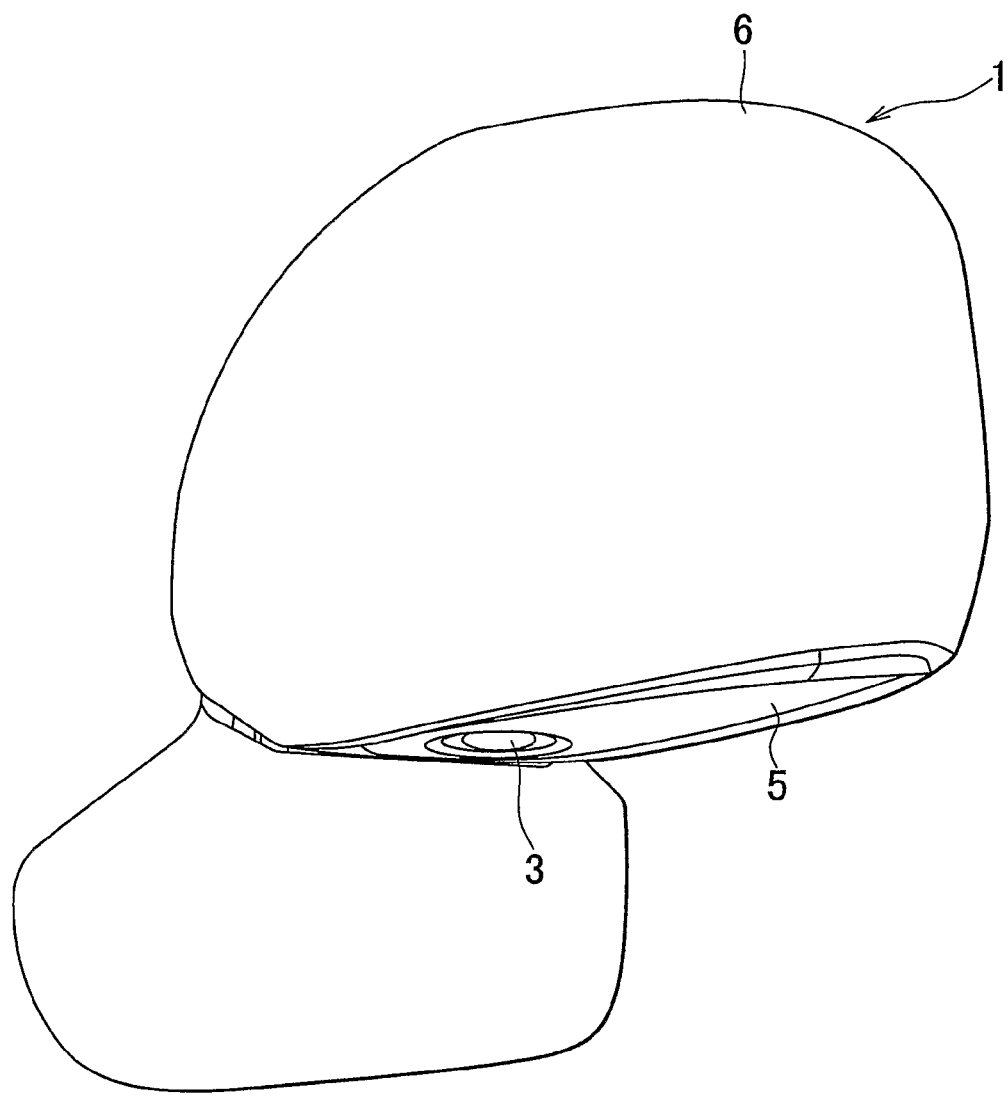
FIG. 1 is a view showing a frame format of a door mirror according to a first example embodiment of the invention, as viewed from the vehicle width direction.
Figure 2:
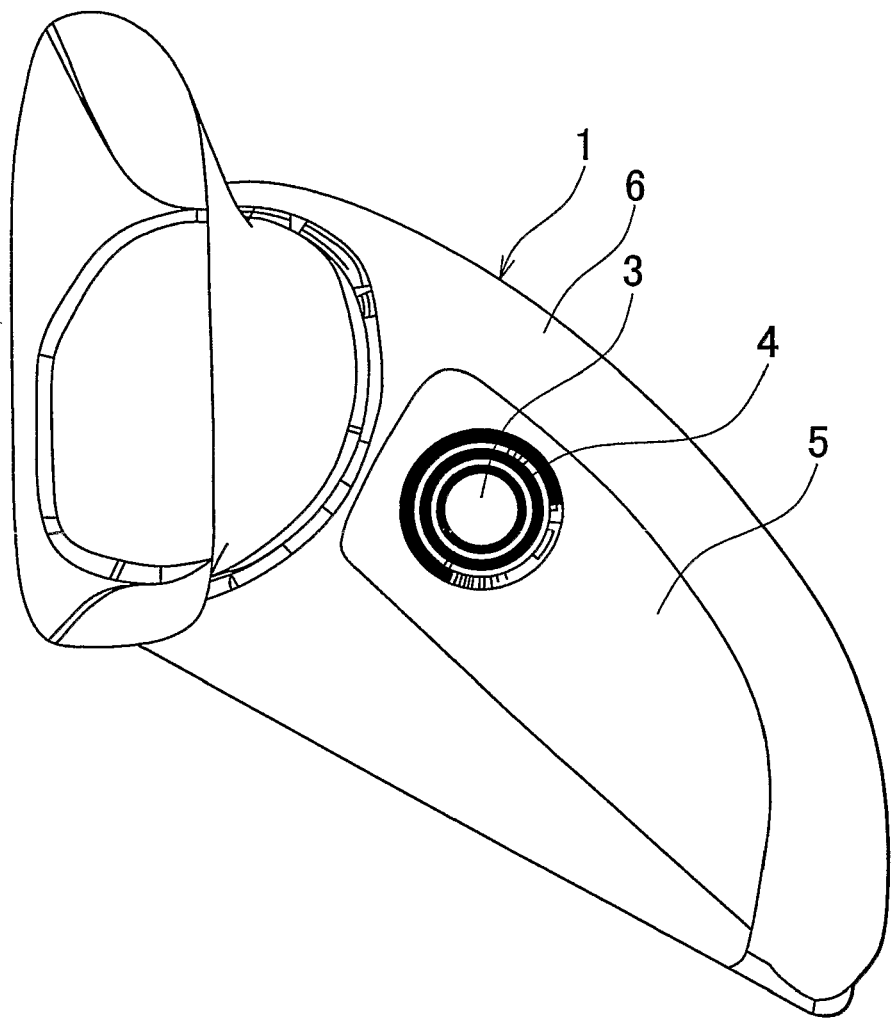
FIG. 2 is a view showing a frame format of the door mirror according to the first example embodiment of the invention, as viewed from below.
Figure 3:
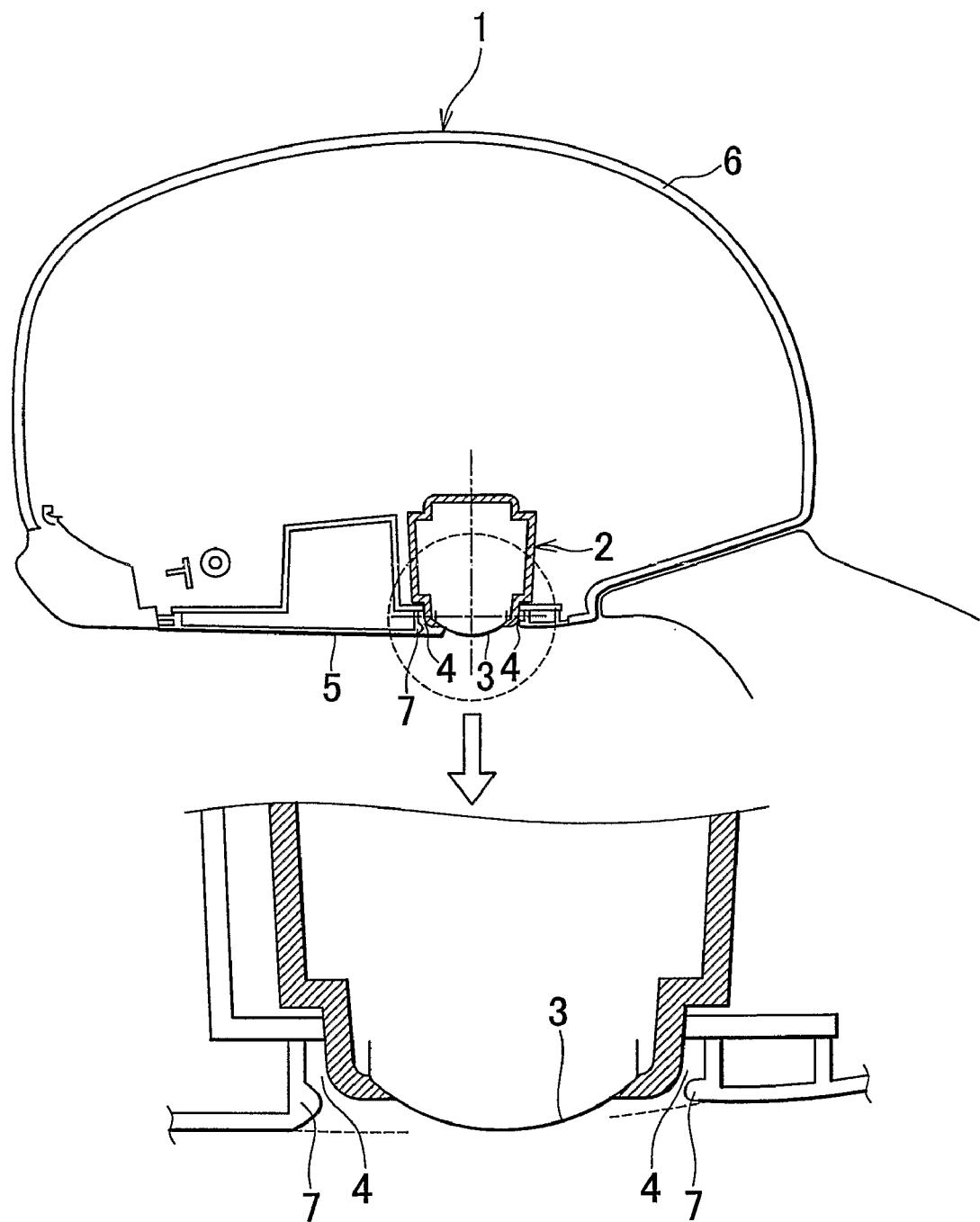
FIG. 3 is a sectional view showing a frame format of the door mirror according to the first example embodiment of the invention.

FIG. 1 is a view showing a frame format of a door mirror according to a first example embodiment of the invention as viewed from the vehicle width direction, FIG. 2 is a view showing a frame format of the door mirror according to the first example embodiment of the invention as viewed from below, and FIG. 3 is a sectional view showing a frame format of the door mirror according to the first example embodiment of the invention at a section that includes the central axis of a lens.

As shown in FIGS. 1 to 3, a door mirror 1 includes a camera 2 which is pointed downward, a groove 4 positioned at least in front of and to the side of, with respect to the longitudinal direction of the vehicle, a lens 3 of the camera 2, which redirects water droplets travelling from the radially outer side of a lens 3 to the radially inner side of the lens 3, a peripheral member 5 to the radially outer side of the lens 3 of the camera 2, and a mirror housing 6. The mirror housing 6 encloses the camera 2, a mirror portion, not shown, and a mirror angle adjusting mechanism that adjusts the angle of the mirror portion, also not shown. The peripheral member 5 is fitted into the lower surface of the mirror housing 6 and adhered thereto.

The camera 2 constitutes an imaging unit that captures an image of the road surface on the passenger's side of the vehicle that extends at least from a front wheel to a rear wheel by having the optical axis of the lens 3 directed (i.e., pointing) downward and having the lens 3 protrude downward from a hole in the peripheral member 5. The camera 2 is supported by the peripheral member 5. Incidentally, the camera 2 itself has a waterproof structure.

The groove 4 constitutes redirecting means formed in an annular (i.e., ring or circular) shape to the radially outer side of the lens 3, for redirecting water droplets that are travelling toward the lens 3 of the camera 2 from the upper portion of the surface of the door mirror 1 down mainly the front and side of the door mirror 1, so that they travel in the direction in which the groove 4 extends instead (hereinafter this direction will simply be referred to as the "direction of the groove"), i.e., in the peripheral direction of the groove 4, using so-called capillary phenomena. Incidentally, in this specification, the front and side of the door mirror refer to the front and side of the door mirror with respect to the longitudinal direction of the vehicle.

Furthermore, the annular groove 4 is formed by a radial space between the camera 2 and the peripheral member 5 positioned to the radially outer side of the lens 3 of the camera 2.

In addition, an annular step 7 is provided which causes the peripheral member 5, which is positioned to the radially outer side of the lens 3 of the camera 2, to protrude to the radially inner side of the lens 3.

This step 7 also constitutes redirecting means which is positioned at least in front of as well as to the side of the lens 3 of the camera 2 for redirecting water droplets that would travel from the radially outer side to the radially inner side of the lens 3. Accordingly, this step 7 inhibits water droplets that would travel from the radially outer side to the radially inner side of the lens 3 from doing so and adhering to the lens 3.

The door mirror 1 of this first example embodiment displays the following operation and effects. That is, the door mirror 1 inhibits water droplets from adhering to the surface of the lens 3 by redirecting water droplets that would otherwise run from the radially outer side toward the radially inner side of the lens 3 over the front or side surface of the door mirror 1 using the annular groove 4 so that those water droplets run in the direction of that groove 4 instead. Incidentally, the direction of the groove 4 is not limited as long as it is a different direction from the radial direction of the lens 3, though preferably it is a circumferential direction that is perpendicular to the radial direction, as in the first example embodiment.

This is because the water droplets are not limited to travelling only down the front and side surfaces of the mirror housing 6 of the door mirror 1, i.e., the water droplets may also travel toward the lens 3 of the camera 2 along another path. By forming the groove 4 in an annular shape as shown in FIG. 1, water droplets that would travel from the radially outer side to the radially inner side of the lens 3 can be redirected by the groove 4, regardless of the path they take, so that they travel in the direction of the groove 4 instead, thereby reliably inhibiting those water droplets from adhering to the lens 3.

Also, forming the redirecting means by the groove 4 makes it possible to avoid having a protrusion in the area captured by the camera 2, as there would be if the water droplets were prevented from reaching the lens 3 by providing a protrusion that protrudes to the outside from the surface of the mirror housing 6 or the peripheral member 5, for example. Thus, it is possible to prevent the area captured by the camera 2 from being made narrower as a result of being partially blocked by the redirecting means.

Furthermore, forming the groove 4 by a space between the camera 2 and the peripheral member 5 positioned to the radially outer side of the lens 3 of the camera 2 obviates the need for adding a separate part. Also, the groove 4 can be formed along the outer peripheral edge of the lens 3 so the groove 4 can be provided on the door mirror 1 with no difficulty in terms of design.

Moreover, providing the step 7 enables water droplets that would otherwise travel from the radially outer side to the radially inner side of the lens 3 to be stripped away from the surface of the door mirror 1 due to the geometric effect of the step 7, and redirects water droplets that travel over the surface of the door mirror 1 toward the lens 3 of the camera 2, thereby inhibiting those water droplets from adhering to the surface of the lens 3.

This is achieved by the water droplets being stripped off at a corner portion of the peripheral member 5 where the water droplets that would travel from the radially outer side toward the radially inner side of the lens 3 on the lower surface of the door mirror 1 are redirected upward by the step 7 from a direction horizontal to the step 7, shown in FIG. 3, based on the inertia force of, and the gravitational force on, the water droplets at the corner portion that redirects them upward from a direction horizontal to the step 7

In particular, if a large number of water droplets have adhered to the surface of the door mirror 1 due to heavy rainfall or the like, those water droplets can be stripped away from the surface of the door mirror 1 in succession so water droplets can be inhibited from adhering to the surface of the lens 3, regardless of how many there are.

Incidentally, if the step 7 is too large, the area captured by the camera 2 will become narrow. Therefore, the size of the step is preferably just large enough to strip the water droplets away and redirect them. Also, the step 7 may also have a suitable tapered shape as shown in FIG. 3.

Also, with the door mirror 1 shown in the first example embodiment, the lens 3 of the camera 2 protrudes from the hole in the peripheral member 5 of the door mirror 1 without having a transparent permanent cover such that it is directly exposed to the outside. This prevents the image captured by the camera 2 from becoming distorted as it may if a lens cover is used.

In the first example embodiment described above, the step 7 causes the peripheral member 5, which is positioned to the radially outer side of the lens 3 of the camera 2, to protrude to the radially inner side of the lens 3. Alternatively, however, the step 7 may be formed protruding downward in the optical direction of the lens 3 of the camera 2.

Figure 4:
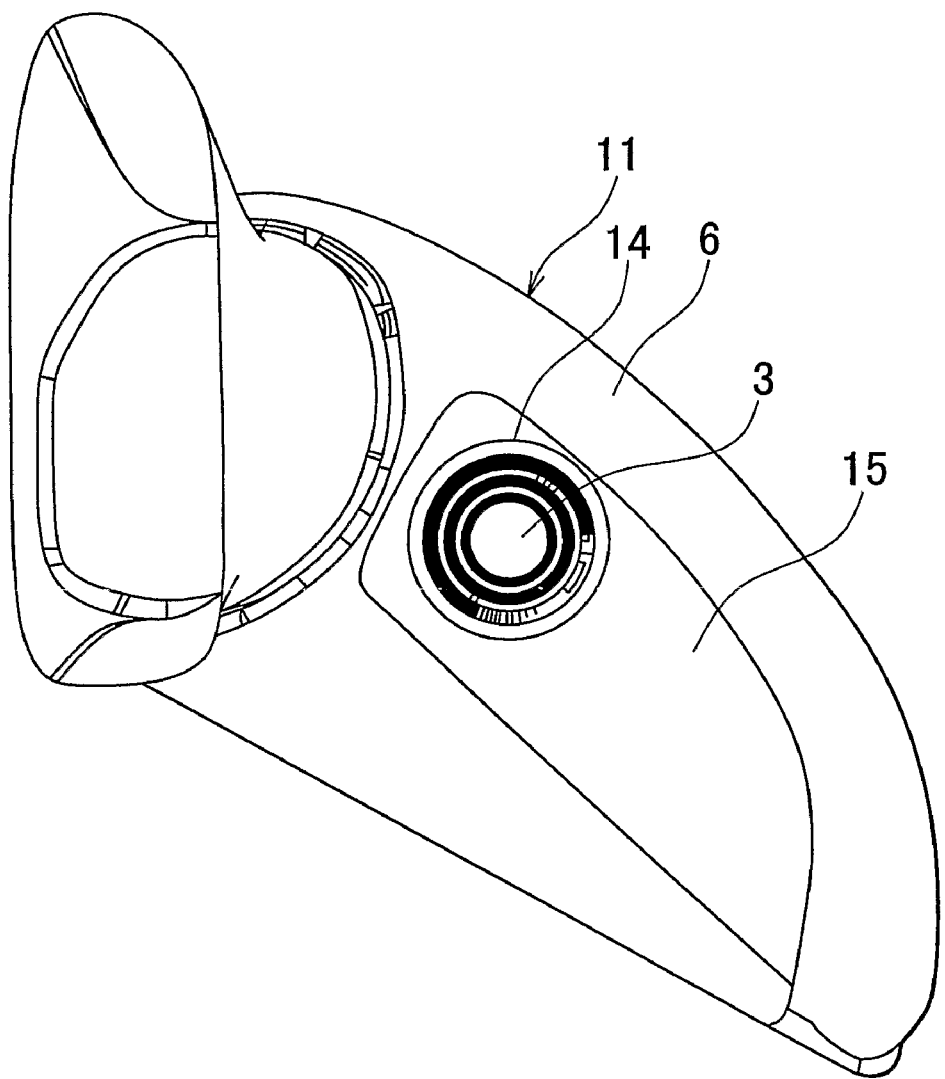
FIG. 4 is a view showing a frame format of a door mirror according to a second example embodiment of the invention, as viewed from below.
Figure 5:
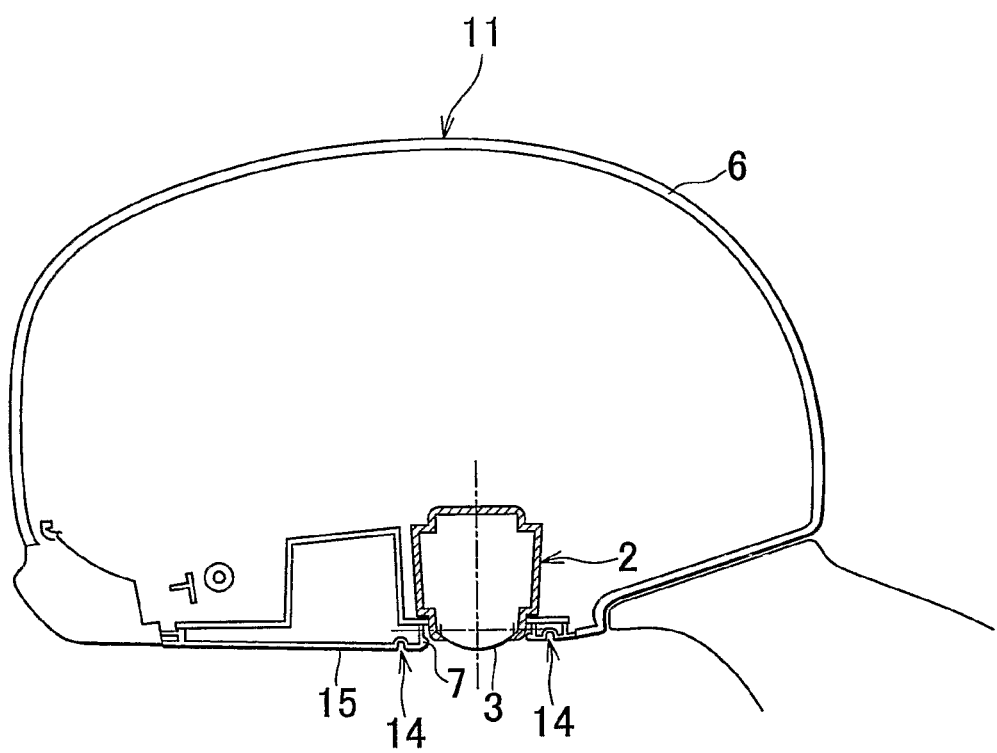
FIG. 5 is a sectional view showing a frame format of the door mirror according to the second example embodiment of the invention.

FIG. 4 view showing a frame format of the door mirror according to a second example embodiment of the invention as viewed from below, and FIG. 5 is a sectional view showing a frame format of the door mirror according to the second example embodiment of the invention at a section that includes the central axis of a lens. Incidentally, constituent elements of the door mirror 11 in this second example embodiment that are the same as constituent elements of the door mirror 1 in the foregoing first example embodiment will be denoted by the same reference numbers.

As shown in FIGS. 4 and 5, a door mirror 11 includes a camera 2 which is pointed downward; a groove 14, positioned at least in front of and to the side of, with respect to the longitudinal direction of the vehicle, a lens 3 of the camera 2, which redirects water droplets that would otherwise travel from the radially outer side of the lens 3 to the radially inner side of the lens 3; a peripheral member 15 to the radially outer side of the lens 3 of the camera 2; and a mirror housing 6. The mirror housing 6 encloses the camera 2, a mirror portion, not shown, and a mirror angle adjusting mechanism that adjusts the angle of the mirror portion, also not shown. The peripheral member 15 is fitted into the lower surface of the mirror housing 6 and adhered thereto.

The camera 2 is an imaging unit that captures an image of the road surface on the passenger's side of the vehicle that extends at least from a front wheel to a rear wheel by having the optical axis of the lens 3 directed (i.e., pointing) downward and having the lens 3 protrude downward from a hole in the peripheral member 15. The camera 2 is supported by the peripheral member 15.

The groove 14 constitutes redirecting means, which is formed in an annular (i.e., ring or circular) shape to the radially outer side of the lens 3, for redirecting water droplets that are advancing toward the lens 3 of the camera 2 from the upper portion of the surface of the door mirror 1 down mainly the front and side of the door mirror 1, so that they travel in the direction in which the groove 4 extends instead (hereinafter this direction will simply be referred to as the "direction of the groove"), i.e., in the peripheral direction of the groove 14, using so-called capillary phenomena. Furthermore, the annular groove 14 is formed in the peripheral member 15 that is positioned to the radially outer side of the lens 3 of the camera 2.

In addition, the peripheral member 15 in this example embodiment also has a step 7, similar to that in the first example embodiment described above. Incidentally, the function of the step 7 is the same as it is in the foregoing first example embodiment.

The door mirror 11 according to the second example embodiment described above displays the following operation and effects. That is, the door mirror 11 inhibits water droplets from adhering to the surface of the lens 3 by redirecting water droplets that would otherwise travel from the radially outer side toward the radially inner side of the lens 3 of the camera 2 over the front or side surface of the door mirror 11, using the annular groove 14 so that those water droplets travel in the direction of the groove 14 instead. Incidentally, the direction of the groove 14 is not limited as long as it is a different direction from the radial direction of the lens 3, though in the second example embodiment it is a circumferential direction that is perpendicular to the radial direction.

This is because the water droplets are not limited to travelling only down the front and side surfaces of the mirror housing 6 of the door mirror 11, i.e., the water droplets may also travel toward the lens 3 of the camera 2 along another path. By forming the groove 14 in an annular shape as in this second example embodiment, water droplets that would otherwise travel from the radially outer side to the radially inner side of the lens 3 can be redirected by the groove 14, regardless of the path they take, so that they travel in the direction of the groove 14 instead, thereby reliably inhibiting those water droplets from adhering to the lens 3.

Also, forming the redirecting means by the groove 14 makes it possible to avoid having a protrusion in the area captured by the camera 2 as there would be if the water droplets were prevented from reaching the lens 3 by providing a protrusion that protrudes to the outside from the surface of the mirror housing 6 or the peripheral member 15, for example. Thus, it is possible to prevent the area captured by the camera 2 from being made narrower as a result of being partially blocked by the redirecting means.

Moreover, providing the step 7 enables water droplets that would otherwise travel from the radially outer side to the radially inner side of the lens 3 to be stripped away from the surface of the door mirror 11, and redirects water droplets that travel over the surface of the door mirror 11 toward the lens 3 of the camera 2, thereby inhibiting those water droplets from adhering to the surface of the lens 3.

In particular, even if a large number of water droplets have adhered to the surface of the door mirror 11 due to heavy rainfall, for example, those water droplets can be stripped away from the surface of the door mirror 11 in succession so water droplets can be inhibited from adhering to the surface of the lens 3, regardless of how many there are or how much rainfall there is.

Also, with the door mirror 11 illustrated in the second example embodiment, the lens 3 of the camera 2 protrudes from the hole in the peripheral member 15 of the door mirror 11 without having a transparent permanent cover such that it is directly exposed to the outside. This prevents the image captured by the camera 2 from becoming distorted as it may if a lens cover is used.

Figure 6:
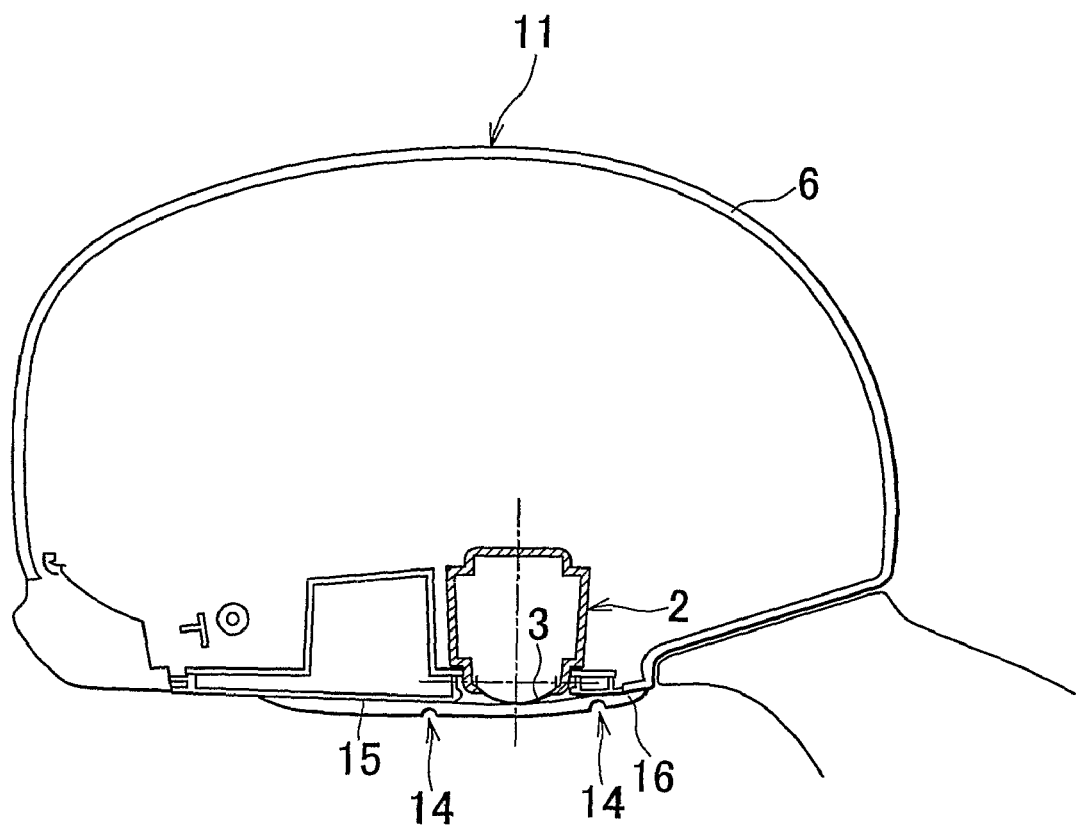
FIG. 6 is a sectional view showing a frame format of the door mirror according to a modified example of the second example embodiment of the invention.
Figure 7:
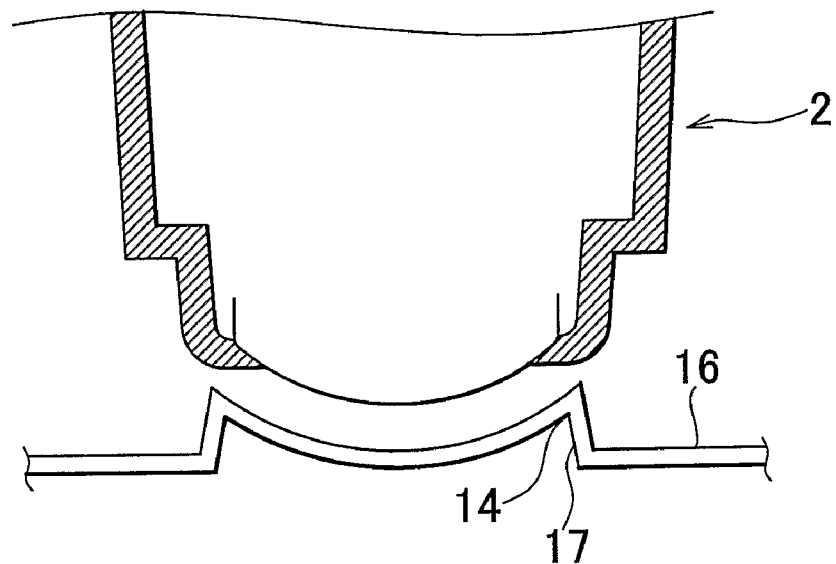
FIG. 7 is a sectional view showing a frame format of the door mirror according to the modified example of the second example embodiment of the invention.

In the second example embodiment described above, the groove 14 which serves as the redirecting means is formed in the peripheral member 15. Alternatively in the door mirror according to a modified example of the second example embodiment of the invention, a lens cover 16 may be provided and the groove 14 may be formed in the lens cover 16, as shown in FIG. 6. With this modified example as well, a step 17 may also be provided, as shown in FIG. 7, similar to the door mirror 1 in the first example embodiment.

As a result, with only a minor change to an existing part, water droplets that travel over the surface of the door mirror 11 toward the lens cover 16 that covers the lens 3 of the camera 2 can be redirected by the groove 14 so that they travel in the direction of the groove 14 instead, thereby inhibiting those water droplets from adhering to the surface of the lens cover 16 that covers the lens 3.

Also, instead of providing the groove 14 on the peripheral member 15 or the lens cover 16, the groove 14 may be provided in the mirror housing 6. In this case, the groove 14 is provided in a position away from the lens 3 of the camera 2 in the radial direction so the shape of the groove 14 may be appropriately changed from being annular to a shape that will match the visible outline of the mirror housing 6 and not be odd from a design standpoint.

In the second example embodiment described above, the step 17 causes the peripheral member 15, which is positioned to the radially outer side of the lens 3 of the camera 2, to protrude to the radially inner side of the lens 3. Alternatively, however, the step 17 may be formed protruding downward in the optical direction of the lens 3 of the camera 2.

Figure 8:
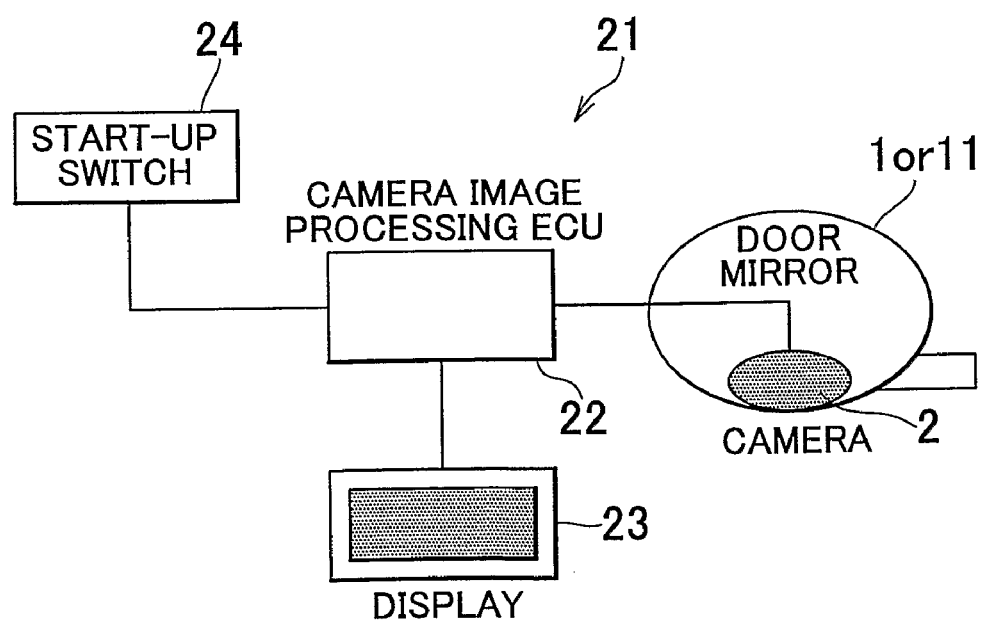
FIG. 8 is a block diagram of a vehicle periphery monitoring apparatus according to a third example embodiment of the invention.

FIG. 8 is a block diagram of a vehicle periphery monitoring apparatus according to a third example embodiment of the invention.

A vehicle periphery monitoring apparatus 21 includes the camera 2 provided in the door mirror 1 described in the first example embodiment or the door mirror 11 described in the second example embodiment, a camera image processing ECU (Electronic Control Unit) 22 and a display 23 that displays an image captured by the camera 2, and a start-up switch 24. The camera image processing ECU 22 and the display 23 together constitute displaying means.

The camera image processing ECU 22 is formed by, for example, a CPU, ROM, RAM, and a data bus that connects the CPU, ROM, and RAM together. The camera image processing ECU 22 performs the following control according to a program stored in the ROM.

At low vehicle speeds, the camera image processing ECU 22 processes (i.e., rotates) an image captured by the camera 2 of both the road surface and the vehicle in the area extending from the front wheel to the rear wheel on the passenger's side of the vehicle, such that the portion in the direction of travel (i.e., the area near the front of the vehicle) is up, and then displays that processed image on the display 23. Incidentally, the camera image processing ECU 22 displays on the display 23 the projected path of the left rear wheel of the vehicle combined with the image as necessary during a left turn (when the driver's seat is on the right side of the vehicle).

This kind of structure helps to prevent the image from becoming distorted due to water droplets adhering to the lens 3 of the camera 2 or the lens cover 16, thereby increasing visibility of the driver. Further, the driver is also able to view the area to the outside of the passenger's seat of the vehicle which is a blind spot for the driver. This helps to prevent a wheel of the vehicle from falling into a ditch or gutter when pulling off to the side of the road, as well as helps to prevent the rear wheel from riding up on a kerb (curb) of a pavement (sidewalk) or the like when making a left turn.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A door mirror comprising:
    an imaging unit that points downward; and
    a redirecting portion, which is positioned at least in front of and to the side of, with respect to the longitudinal direction of a vehicle, a lens of the imaging unit, that redirects a water droplet that would otherwise travel from a radially outer side to a radially inner side of the lens,
    wherein the redirecting portion includes at least one of a groove or a step,
    wherein the redirecting portion is formed in an annular shape.

2. The door mirror according to claim 1, wherein the redirecting portion includes a groove.

3. The door mirror according to claim 2, further comprising:
- a peripheral member positioned to the radially outer side of the imaging unit and the lens of the imaging unit,
- wherein the groove is formed in a space between the peripheral member and the imaging unit.

4. The door mirror according to claim 3, wherein:
- the peripheral member is fitted into and adhered to a lower surface of a mirror housing that encloses the imaging unit; and
- the peripheral member includes a hole allowing the lens of the imaging unit to protrude downward.

5. The door mirror according to claim 2, further comprising:
- a peripheral member positioned to the radially outer side of the imaging unit and the lens of the imaging unit,
- wherein the groove is formed in the peripheral member.

6. The door mirror according to claim 2, further comprising:
- a lens cover that covers the lens of the imaging unit,
- wherein the groove is formed in the lens cover.

7. The door mirror according to claim 2, wherein the groove is perpendicular to the radial direction of the lens of the imaging unit.

8. The door mirror according to claim 2, further comprising:
- a step that strips away the water droplet that would otherwise travel from the radially outer side to the radially inner side of the lens of the imaging unit.

9. The door mirror according to claim 8, wherein the step protrudes toward the radially inner side of the lens.

10. The door mirror according to claim 8, wherein the step protrudes downward in the axial direction of the lens.

11. The door mirror according to claim 8, further comprising:
- a lens cover that covers the lens of the imaging unit,
- wherein the step is formed in the lens cover.

12. The door mirror according to claim 8, wherein the step is formed in an annular shape.

13. The door mirror according to claim 8, wherein the step is perpendicular to the radial direction of the lens of the imaging unit.

14. A vehicle periphery monitoring apparatus comprising:
- the door mirror according to claim 1; and
- a displaying unit that displays an image captured by the imaging unit.

15. The door mirror according to claim 1, further comprising:
- a peripheral member positioned to the radially outer side of the lens of the imaging unit,
- wherein the redirecting portion includes a protruding step formed on the peripheral member.

16. The door mirror according to claim 15, wherein the step protrudes out to the radially inner side of the lens.

17. The door mirror according to claim 15, wherein the step protrudes downward in the axial direction of the lens.

18. The door mirror according to claim 15, further comprising:
- a lens cover that covers the lens of the imaging unit,
- wherein the step is formed in the lens cover.

19. The door mirror according to claim 15, wherein the step is perpendicular to the radial direction of the lens of the imaging unit.

* * * * *